(12) United States Patent
Ostermeyer et al.

(10) Patent No.: US 10,856,373 B2
(45) Date of Patent: Dec. 1, 2020

(54) POWER SUPPLY FOR ELECTRIC ARC GAS HEATER

(71) Applicant: Umicore, Brussels (BE)

(72) Inventors: John Ostermeyer, Aartselaar (BE); Jeroen Heulens, Kerkom (BE)

(73) Assignee: Umicore, Brussels (BE)

( * ) Notice: Subject to any disclaimer, the term of this patent is extended or adjusted under 35 U.S.C. 154(b) by 593 days.

(21) Appl. No.: 15/516,055

(22) PCT Filed: Sep. 25, 2015

(86) PCT No.: PCT/EP2015/072084
§ 371 (c)(1),
(2) Date: Mar. 31, 2017

(87) PCT Pub. No.: WO2016/050627
PCT Pub. Date: Apr. 7, 2016

(65) Prior Publication Data
US 2018/0235037 A1 Aug. 16, 2018

(30) Foreign Application Priority Data
Oct. 1, 2014 (EP) .................................. 14187236

(51) Int. Cl.
*H05B 7/18* (2006.01)
*B23K 9/073* (2006.01)
(Continued)

(52) U.S. Cl.
CPC ............. *H05B 7/185* (2013.01); *B23K 9/073* (2013.01); *H05B 7/144* (2013.01); *H05H 1/36* (2013.01)

(58) Field of Classification Search
None
See application file for complete search history.

(56) References Cited

U.S. PATENT DOCUMENTS 4,009,365 A * 2/1977 Kalev .................. B23K 9/0732
219/130.51
4,324,971 A * 4/1982 Frappier .............. B23K 9/0735
219/121.36
(Continued)

FOREIGN PATENT DOCUMENTS

CN 1058087 A 1/1992
JP 6092081 A 5/1985
(Continued)

OTHER PUBLICATIONS

Mogensen, P., et al., "Electrical and Mechanical Technology of Plasma Generation and Control", Plasma Technology in Metallurgical Processing (J. Feinman, The Iron and Steel Society 1986), Chapter 6, pp. 65-76.
(Continued)

*Primary Examiner* — Ibrahime A Abraham
*Assistant Examiner* — Gyounghyun Bae
(74) *Attorney, Agent, or Firm* — NK Patent Law

(57) ABSTRACT

This invention concerns power supplies suitable for electric arc gas heaters such a plasma torches. It more particularly relates to the dimensioning of the inductor in the switched-mode DC to DC converter used for feeding the torch. The invention concerns in particular a DC power supply for driving a non-transferred electric arc gas heater, comprising: an AC to DC rectifier providing a potential $U_0$; a DC to DC switching converter having a switching frequency $f_S$; a current control loop having a latency Formula (I); and, a ballast inductor having an inductance L; characterized in that inductance L is such that Formula (II) and Formula (III). Such a design ensures the stability of the current control loop, while also ensuring a sufficient amount of current ripple to spread out the erosion zone on the electrodes of the torch.

(Continued)

$$\tau; \quad \text{(I)}$$

$$L > \left(\frac{U_0}{1500}\right)\tau, \quad \text{(II)}$$

$$L < \frac{1}{f_s}\left(\frac{U_0}{200}\right). \quad \text{(III)}$$

12 Claims, 1 Drawing Sheet

(51) Int. Cl.
*H05B 7/144* (2006.01)
*H05H 1/36* (2006.01)

(56) References Cited

U.S. PATENT DOCUMENTS

| | | | |
|---|---|---|---|
| 4,543,470 A | 9/1985 | Santen et al. | |
| 4,580,080 A * | 4/1986 | Smith | H05B 41/392 315/199 |
| 5,055,742 A * | 10/1991 | Jurell | H05B 41/382 315/106 |
| 5,086,205 A * | 2/1992 | Thommes | B23K 10/00 219/121.54 |
| 5,144,205 A * | 9/1992 | Motto | H05B 41/382 315/174 |
| 5,166,871 A * | 11/1992 | Carroll | H02M 3/156 323/282 |
| 5,170,030 A * | 12/1992 | Solley | B23K 10/006 219/121.48 |
| 5,262,699 A * | 11/1993 | Sun | H05B 41/2855 315/127 |
| 5,349,605 A | 9/1994 | Campbell | |
| 5,399,957 A | 3/1995 | Vierboom | |
| 5,530,220 A * | 6/1996 | Tatham | H05H 1/36 219/121.54 |
| 5,643,475 A | 7/1997 | Karino et al. | |
| 5,831,237 A * | 11/1998 | Daniel | H05H 1/36 219/121.54 |
| 5,925,267 A * | 7/1999 | Kitahashi | H05H 1/34 219/121.57 |
| 5,990,443 A * | 11/1999 | Tatham | H05H 1/36 219/121.54 |
| 6,046,548 A * | 4/2000 | Kominami | H05B 41/2928 315/246 |
| 6,133,543 A * | 10/2000 | Borowy | H05H 1/36 219/121.57 |
| 6,670,572 B2 * | 12/2003 | Norris | H05H 1/36 219/121.54 |
| 6,794,601 B2 * | 9/2004 | Norris | B23K 10/006 219/121.51 |
| 7,411,353 B1 * | 8/2008 | Rutberg | H05H 1/44 315/111.21 |
| 7,567,067 B2 * | 7/2009 | Lee | H02M 3/156 315/224 |
| 9,629,206 B1 * | 4/2017 | Mays, II | H05B 45/00 |
| 9,878,395 B2 * | 1/2018 | Salsich | B23K 10/00 |
| 2006/0244392 A1 * | 11/2006 | Taipale | H05B 41/282 315/200 R |
| 2009/0129131 A1 * | 5/2009 | Hosemans | H01J 49/105 363/89 |
| 2009/0134129 A1 * | 5/2009 | Robarge | H01H 33/76 219/121.48 |
| 2010/0134023 A1 * | 6/2010 | Mills | H05B 41/3922 315/174 |
| 2011/0127926 A1 * | 6/2011 | Samejima | H05B 41/2886 315/291 |
| 2011/0128508 A1 * | 6/2011 | Yamada | H05B 41/2883 353/85 |
| 2013/0265810 A1 * | 10/2013 | Kawato | H05H 1/46 363/131 |
| 2015/0191827 A1 * | 7/2015 | Hunt | C23C 24/082 438/470 |

FOREIGN PATENT DOCUMENTS

| | | | |
|---|---|---|---|
| JP | 8137559 A | 5/1996 | |
| WO | 9118488 A1 | 11/1991 | |

OTHER PUBLICATIONS

Pfender, E., "Electric Arcs and Arc Gas Heaters", Gaseous Electronics, (Academic, New York 1978) vol. 1, Chapter 5, pp. 291-398.
Suh, Y., et al., "A Study on Medium Voltage Power Conversion System for Plasma Torch", IEEE, (2008), pp. 437-443.
International Search Report for PCT/EP2015/072084, dated Dec. 8, 2015.
Llii, S.M., et al., "Considerations Concerning Plasma Arc Cutting Machining", ICMEN: Laser, Electro Erosion and Plasma Machining, Oct. 2008, pp. 185-192.
Nemchinsky, Valerian, "Erosion of Thermionic Cathodes in Welding and Plasma Arc Cutting Systems", IEEE Transactions on Plasma Science, vol. 42, No. 1, Jan. 2014, pp. 199-215.
Harris, W.J., et al., "Cathode Erosion Research on Medium to High Power Arcjet Thrusters", IEPC-93-028, Pulsed Power and Electric Propulsion Laboratory, Texas Tech University, 13 pages.
Rufer, A., "Power electronics course DC/DC conversion: Chapter 1", Polytechnic University Fé Déalalusausanne, p. 68. Translation provided using Google Translate.
Timoor A Sakharuk et al: "Effects of Finite Switching Frequency and Delay on PWM Controlled Systems", IEEE Transactions on Circuits and Systems, Apr. 2000, vol. 47, No. 2, pp. 555-567.
EPO; Summons to attend oral proceedings pursuant to Rule 115(1) EPC for European Patent Application No. 15767523.2 dated Oct. 14, 2019, 14 pages.
Response to Communication of notices of opposition (R.79(1)-EPC) for European Patent Application No. 15767523.2 dated Jun. 25, 2019, 5 pages.
Comments regarding Notice of Opposition for European Patent Application No. 15767523.2 dated Oct. 1, 2019, 6 pages.
Third Party Observation for Application No. EP20150767523 dated Nov. 17, 2017, 9 pages.

\* cited by examiner

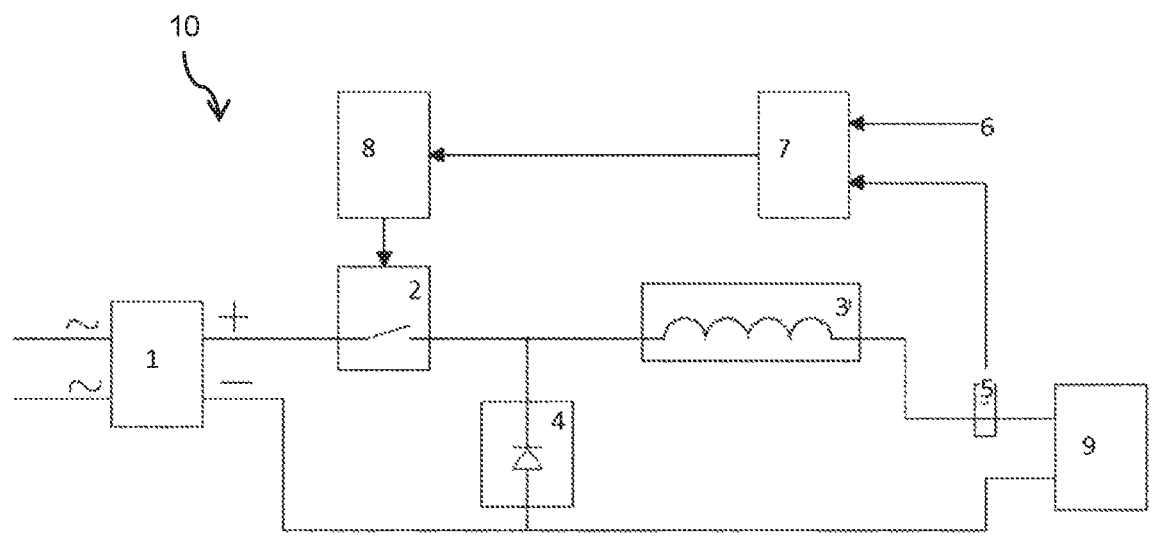

POWER SUPPLY FOR ELECTRIC ARC GAS HEATER

This application is a National Stage application of International Application No. PCT/EP2015/072084, filed Sept. 25, 2015. This application also claims priority under 35 U.S.C. § 119 to European Application No. 14187236.6, filed Oct. 1, 2014.

FIELD OF THE INVENTION

This invention concerns DC power supplies suitable for electric arc gas heaters such a plasma torches. It more particularly relates to the dimensioning of the inductor in a switched-mode DC to DC converter used for feeding the torches.

BACKGROUND OF THE INVENTION

Electric arc gas heaters are powerful tools to heat up virtually any type of gas to extreme temperatures. There are many descriptions available nowadays for such devices, e.g. in "Electric Arcs and Arc Gas Heaters", E. Pfender, Chapter 5, Gaseous Electronics. In numerous industrial applications, the high potential of gases heated to the plasma state is recognized. Examples are: powder spraying and coating, production of nano-sized powders, extractive metallurgy, aerospace engineering, etc.

BRIEF DESCRIPTION OF THE DRAWINGS

FIG. 1 illustrates a block diagram of an electric arc gas heater.

DETAILED DESCRIPTION OF THE INVENTION

In electric arc gas heaters, also known as plasma torches, a gas is entered through an input port into a flow-through chamber, in which an electric arc is maintained. The gas heats up to extreme temperatures and is expelled as a plasma through an output port.

The arc is generated and sustained by an electric power supply that is connected to an anode and a cathode, both located within the gas flow-through chamber. The arc remains confined within the chamber and is therefore said to be non-transferred. An example of such an arc gas heater is shown in U.S. Pat. No. 4,543,470.

Achieving high power operation implies the combination of high arc voltages and currents. High voltage operation can be achieved by lengthening the arc. Longer arcs can be obtained by forcing the arc through a vortex-stabilized and electrically-isolated zone between the electrodes. This type of gas heater is called "segmented" or "constricted". According to current practice, the maximum allowable current is limited as electrode erosion may become excessive.

Non-transferred arcs are most often fed with direct current (DC); using alternating current (AC) indeed leads to less stable operation due to repeated interruption of the arc at each zero-crossing of the AC cycle.

An electric arc has a unique U-I (voltage-current) characteristic in which the arc voltage decreases with increasing arc current. This corresponds to a negative differential resistance posing regulation challenges to the DC power supply. These challenges are well described in "Electrical And Mechanical Technology of Plasma Generation and Control", P. Mogensen and J. Thörnblom, Chapter 6, Plasma Technology in Metallurgical Processing.

Although a ballast resistor in series with a DC voltage source could theoretically be used to stabilize the operating point of the arc, the ohmic losses in the resistor would be excessive.

A first solution to this problem has been to combine silicon-controlled rectifiers with a ballast inductor in series with the torch. The role of the inductor is to stabilize the current to the load between successive actions of the regulator. The rectifiers are controlled to maintain a constant current through the load. The latency of the electronic regulation is however significant as the switching frequency is a small multiple (typically 6 or 12) of the mains frequency, and thus limited to a few hundred Hz. Consequently, a large inductance is needed.

A theoretical attempt to design a multi megawatt DC power supply for plasma torch operation according to the above principle is given in "A study on medium voltage power conversion system for plasma torch", Y. Suh, Power Electronics Specialists Conference, IEEE, 2008. Herein it is recognized that the size of the inductor is inversely proportional to the switching frequency of the rectifying unit.

A more modern approach is the use of a state of the art DC power supply comprising a rectifying unit followed by a switching DC to DC converter. Such switchers can operate at relatively higher frequencies such as 2 kHz, even when designed for high powers in the megawatt range. The DC-DC converter is regulated to behave as a constant current supply. To this end, a pulse-width modulated chopper is used, the pulse-width being continuously adapted by a feedback controller comparing the instantaneous torch current with a set-point value. A DC to DC converter also provides for isolation between the chopper pulses and the grid, solving most of the power factor and grid pollution issues typical of silicon-controlled rectifiers.

This type of realization is illustrated in e.g. U.S. Pat. No. 5,349,605.

The role of the inductor is most important in ensuring stable operation of a torch. As described in above-mentioned "Electrical And Mechanical Technology of Plasma Generation and Control", P. Mogensen and J. Thörnblom, Chapter 6, Plasma Technology in Metallurgical Processing, the size of the output inductance is determined by three main factors: (1) limiting the rate of current increase after ignition of the electric arc to what the control loop can handle, (2) providing a smoothing effect to reduce the current ripple produced by the switching devices in the power supply, and, (3) providing uninterrupted current during start-up of the plasma torch.

Although the size of the ballast inductor determines whether or not a specific power supply topology is able to stabilize the electric arc in a plasma torch, no references are available in the prior art to derive a suitable inductance for a specific installation. In fact, "sufficiently large" inductors are taught, which, in practice means that these inductors are generally overdesigned. Such an inductor however carries a substantial part of the investment of a multi megawatt DC power supply, as a plasma generator may operate at several thousand amperes. The costs of the inductor indeed scales with the inductance and with the maximum current.

According to the present invention, the inductance should preferably be chosen within a certain range. The lower limit is needed to fulfill the stability criterion of the current feedback loop. The upper limit is determined by a need for a certain minimum current ripple. This ripple is desired because it tends to periodically vary the length of the arc slightly, thereby spreading out the erosion zone on the electrodes. This spreading of the wear allows for higher current operation.

Contrary to conventional DC-DC PSU design rules, the minimum inductance needed is, in this case, not dictated by the minimum current and by the desire to keep the power supply in continuous mode. Industrial torches are indeed intended to work within a restricted range of relatively high currents only.

The invention concerns in particular a DC power supply for driving a non-transferred electric arc gas heater, comprising: an AC to DC rectifier providing a potential $U_0$; a DC to DC switching converter having a switching frequency $f_S$; a current control loop having a latency $\tau$; and, a ballast inductor having an inductance L; characterized in that inductance L is such that $$L > \left(\frac{U_0}{1500}\right)\tau, \text{ and } L < \frac{1}{f_s}\left(\frac{U_0}{200}\right).$$

In another embodiment, the invention concerns a method of operating a non-transferred electric arc gas heater, characterized in that the heater is fed with a current of more than 500 A RMS, the current comprising a DC component and an AC component, the AC component having a peak to peak amplitude between 50 A and 20% of the DC component, and preferably between 50 A and 10% of the DC component.

The DC to DC converter is preferably a buck converter.

With respect to industrial applications, the potential $U_0$ delivered by the AC to DC rectifier should preferably be above 3000 V, and the power delivered to the load be between 1 and 10 MW. Such a power supply is especially adapted for powering a non-transferred segmented plasma torch with hollow electrodes.

By $U_0$ is meant the loaded output voltage (in Volt) of the AC to DC rectifier. While this voltage should be high enough to provide enough potential to sustain the electric arc at all conditions, it also increases the minimum required size of the ballast inductor.

By the switching frequency $f_S$ is meant the frequency (in Hertz) of the pulse-width modulated chopper used to regulate the current to the load.

By the latency $\tau$ of the control loop is meant the time interval (in second) between sampling the current and the subsequent control action. In case of a digital regulator, it includes the sampling and averaging of the current, the A/D conversion time, and the control loop calculations. The latency includes the delay imposed by the pulse-width modulator that is part of the DC tot DC conversion unit. A short latency is generally beneficial, allowing the use of a smaller ballast inductance.

We have found that for a high-power non-transferred non-segmented electric arc gas heater, the ballast inductor should have an inductance L (in Henry) of more than $$\left(\frac{U_0}{1500}\right)\tau.$$

The electric arc inside a plasma torch is particularly unstable on a timescale of about 10 to 100 µs. Within this timescale, the electric arc roots may move stochastically on the electrode surfaces. A varying current will further boost the wandering of the roots, thus spreading out the electrode wear and increasing the electrode lifetime. According to the invention, use is made of the current ripple generated in the chopper to enhance this effect.

In a DC to DC switching converter, the ripple is maximum when the duty cycle of the chopper amounts to 50%. In that particular case, the ripple can be expressed as $$\Delta I = \frac{U_0}{4f_sL}.$$

Neglecting secondary effects, the ripple varies as D(1−D), D being the duty cycle of the chopper pulses.

Using conventional well filtered DC, we have learned that at average currents above 500 A, the electrode wear becomes too high for industrial purposes. On the other hand, the electrode erosion is surprisingly well spread if at least 50 A peak to peak of current ripple is superposed. This allows to reach average currents between 500 and 2000 A while avoiding premature electrode erosion. This contrasts with classical power supplies, designed to deliver a clean constant current output with low ripple. The constraint on the ballast inductor, assuming a typical duty cycle of 50%, and a ripple current of at least 50 A, can be determined as $$L < \frac{1}{f_s}\left(\frac{U_0}{200}\right).$$

This equation remains valid in practice for duty cycles between 20 and 80%, i.e. across the range of the practical operating conditions for industrial high power plasma's.

FIG. 1 illustrates a block diagram of an electric arc gas heater 10 the invention. Are shown:
(1) the AC to DC rectifier producing a DC voltage of $U_0$;
(2) the pulse-width modulated chopper, operating at frequency $f_S$;
(3) the ballast inductor with inductance L;
(4) the fly-back diode, part of the buck converter topology;
(5) the sensor reporting the instantaneous torch current;
(6) the desired torch current or set-point value;
(7) the current regulator, comparing the instantaneous torch current with the set-point value;
(8) the unit driving the pulse-width modulation of the chopper based on the output of the regulator;
(9) the plasma torch.

The following example illustrates an apparatus according to the invention. A 4 MW power supply comprises a rectifying unit delivering a voltage under nominal load of 3000 V ($U_0$), and a chopper unit equipped with IGBT switching devices operating at 2 kHz ($f_S$).

A ballast inductor is placed in series with an electric arc heater having a nominal power rating of 2.5 MW. The current to the load is measured using a Hall-probe and the value is fed to a PID regulator. A current set-point of 1000 A is chosen, which, for this particular torch, corresponds to a potential of about 1450 V. The duty cycle (D) of the chopper is thus about 48%.

The digital PID regulator induces a delay of 1 ms, and the chopper adds a further mean delay of 0.5 ms. A control loop latency of 1.5 ms ($\tau$) is thus considered. According to the invention, a minimum inductance of 3 mH is needed to ensure the stability of the control loop.

The maximum inductance is calculated according to the invention as 7.5 mH. This indeed ensures the desired peak to peak current ripple of 50 A.

To maximize electrode lifetime and power supply robustness, a value of 4 mH is chosen for this specific installation.

The invention claimed is:

1. A DC power supply for driving a non-transferred electric arc gas heater, comprising:
   an electrode;
   an AC to DC rectifier configured to provide a voltage potential $U_0$; and
   a MW-level DC to DC switching converter coupled between the AC to DC rectifier and the electrode, wherein the MW-level DC to DC switching converter comprises:
      a pulse-width modulated chopper configured to operate at a switching frequency $f_s$; and
      a ballast inductor coupled between the pulse-width modulated chopper and the electrode, wherein:
         the MW-level DC to DC switching converter is configured to have a current control loop latency $\tau$;
         the ballast inductor is configured to provide a minimum inductance greater than $$\left(\frac{U0}{1500}\right)\tau$$

to maintain a loop stability criterion; and
      the ballast inductor is further configured to provide a maximum inductance less than $$\frac{1}{fs}\left(\frac{U0}{200}\right)$$

to produce a peak to peak current ripple to enhance wandering of electric arc roots on the electrode under operation.

2. The DC power supply according to claim 1, wherein the DC to DC converter is a buck converter.

3. The DC power supply according to claim 1, wherein $U_0$>3000 V.

4. The DC power supply according to claim 1, wherein power delivered to the non-transferred electric arc gas heater is between 1 and 10 MW.

5. The DC power supply according to claim 1, wherein the non-transferred electric arc gas heater is a non-transferred segmented plasma torch with hollow electrodes.

6. The DC power supply of claim 1, wherein:
   the MW-level DC to DC switching converter further comprises a regulator; and
   the current control loop latency $\tau$ includes a first time delay of the regulator and a second time delay of the pulse-width modulated chopper.

7. The DC power supply of claim 1, wherein the peak to peak ripple current is at least 50 amps over a duty cycle range of the pulse-width modulated chopper.

8. The DC power supply of claim 7, wherein the duty cycle range is at least 20% to 80%.

9. A method of operating a non-transferred electric arc gas heater having a MW-level DC to DC switching converter coupled with an electrode, the method comprising:
   providing a voltage potential $U_0$ to an input of the MW-level DC to DC switching converter; and
   providing a current from an output of the MW-level DC to DC switching converter to the electrode, wherein the MW-level DC to DC switching converter comprises:
      a pulse-width modulated chopper configured to operate at a switching frequency $f_s$; and
      a ballast inductor coupled between the pulse-width modulated chopper and the electrode, wherein:
         the MW-level DC to DC switching converter is configured to have a current control loop latency $\tau$; and
         the ballast inductor is configured to provide a minimum inductance greater than $$\left(\frac{U0}{1500}\right)\tau$$

to maintain a loop stability criterion; and
      the ballast inductor is further configured to provide a maximum inductance less than $$\frac{1}{fs}\left(\frac{U0}{200}\right)$$

to produce a peak to peak current ripple to enhance wandering of electric arc roots on the electrode under operation.

10. The method of claim 9, wherein:
    the MW-level DC to DC switching converter further comprises a regulator; and
    the current control loop latency $\tau$ includes a first time delay of the regulator and a second time delay of the pulse-width modulated chopper.

11. The method of claim 9, wherein the peak to peak ripple current is at least 50 amps over a duty cycle range of the pulse-width modulated chopper.

12. The method of claim 11, wherein the duty cycle range is at least 20% to 80%.

* * * * *